United States Patent
Chacko et al.

(10) Patent No.: US 11,983,295 B2
(45) Date of Patent: May 14, 2024

(54) METHOD AND SYSTEM FOR IDENTIFYING PERSONALLY IDENTIFIABLE INFORMATION (PII) THROUGH SECRET PATTERNS

(71) Applicant: HCL Technologies Limited, New Delhi (IN)

(72) Inventors: Simy Chacko, Chennai (IN); Venkatesh Shankar, Chennai (IN); Ramesh Gurusamy, Chennai (IN); Sumathi Babu, Chennai (IN)

(73) Assignee: HCL Technologies Limited

( * ) Notice: Subject to any disclaimer, the term of this patent is extended or adjusted under 35 U.S.C. 154(b) by 284 days.

(21) Appl. No.: 17/676,881

(22) Filed: Feb. 22, 2022

(65) Prior Publication Data

US 2022/0284119 A1 Sep. 8, 2022

(30) Foreign Application Priority Data

Mar. 5, 2021 (IN) .............................. 202111009409

(51) Int. Cl.
*G06F 21/62* (2013.01)
*G06F 18/24* (2023.01)
(Continued)

(52) U.S. Cl.
CPC .......... *G06F 21/6245* (2013.01); *G06F 18/24* (2023.01); *G06F 18/24765* (2023.01); *G06F 21/79* (2013.01)

(58) Field of Classification Search
None
See application file for complete search history.

(56) References Cited

U.S. PATENT DOCUMENTS

| 7,885,944 B1 * | 2/2011 | Bruening ................ G06F 16/33 707/694 |
| 9,058,590 B2 | 6/2015 | Criddle et al. |

(Continued)

FOREIGN PATENT DOCUMENTS

WO 2017173409 A1 11/2020

OTHER PUBLICATIONS

CASHEIRS: Cloud Assisted Scalable Hierarchical Encrypted Based Image Retrieval System. Li. IEEE. (Year: 2017).*
(Continued)

*Primary Examiner* — Venkat Perungavoor (57) ABSTRACT

This disclosure relates to method and system for identifying Personally Identifiable Information (PII) through secret patterns. The method includes receiving user data from at least one data source through a plurality of communication channels. The user data includes PII and non-PII. The user data is associated with a user. The PII includes a plurality of personal identifiers. The method further includes identifying the PII in user data through a predictive model. The method further includes generating a secret pattern based on the PII identified through the predictive model. The secret pattern is an identifiable label. The method further includes adding the secret pattern to each of the plurality of personal identifiers in PII. The method further includes identifying each of the plurality of personal identifiers through the secret pattern in real-time, when user data is transmitted from the at least one data source to at least one data destination.

20 Claims, 5 Drawing Sheets

(51) Int. Cl.
*G06F 21/78* (2013.01)
*G06F 21/79* (2013.01)
*G06F 21/64* (2013.01)

(56) References Cited

U.S. PATENT DOCUMENTS

| | | |
|---|---|---|
| 10,152,609 B2 | 12/2018 | Grubel et al. |
| 10,585,989 B1 | 3/2020 | Ahmed et al. |
| 10,728,225 B1 | 7/2020 | Zhou et al. |
| 11,711,216 B1* | 7/2023 | Poh ............... H04L 9/3231 |
| | | 713/186 |
| 2007/0223955 A1* | 9/2007 | Kawabuchi ........... G03G 21/04 |
| | | 399/80 |
| 2009/0024853 A1* | 1/2009 | Yeap ............... H04L 9/083 |
| | | 713/182 |
| 2011/0196795 A1* | 8/2011 | Pointer ............. G06Q 40/02 |
| | | 705/30 |
| 2021/0133350 A1* | 5/2021 | Kirti ............... G06F 21/6245 |
| 2024/0012887 A1* | 1/2024 | Johnston ........... G10L 19/018 |

OTHER PUBLICATIONS

Rohit Ranchal, Bharat Bhargava, Lotfi Ben Othmane, Leszek Lilien, Anya Kim, Myong Kang, An Approach for Preserving Privacy and Protecting Personally Identifiable Information in Cloud Computing; Sep. 2010.

Meisam Navaki Aref, Geoffrey Alexander, Jedidiah R. Crandall, PIITracker: Automatic Tracking of Personally Identifiable Information in Windows, Apr. 23-26, 2018, Porto, Portugal.

* cited by examiner

METHOD AND SYSTEM FOR IDENTIFYING PERSONALLY IDENTIFIABLE INFORMATION (PII) THROUGH SECRET PATTERNS

TECHNICAL FIELD

This disclosure relates generally to Personally Identifiable Information (PII), and more particularly to method and system for identifying PII through secret patterns.

BACKGROUND

In present scenario, when a system or an enterprise grows, the number of microservices, data stores, and internal and external communication increases. Further, event-based architectures are used nowadays. In such a scenario, tracking data flow is becoming an increasingly difficult task. Moreover, privacy and data protection of users is a growing concern.

In particular, enterprises dealing in big data (collection or analysis) are faced with the problem of managing Personally Identifiable Information (PII) of users. Enterprises which run on an advertisement-heavy revenue model, generally outsource user data to third-party organizations. In the present state of art, PII associated with the user is either not removed or partially removed from the user data being shared.

The conventional techniques fail to provide for a robust data tracking system to identify PII within the user data and monitor data flow of the PII. There is, therefore, a need in the present state of art for techniques to identify the PII from user data and monitor data flow of the PII.

SUMMARY

In one embodiment, a method for identifying Personally Identifiable Information (PII) through secret patterns is disclosed. In one example, the method includes receiving user data from at least one data source through a plurality of communication channels. It may be noted that the user data includes PII and non-PII. The user data is associated with a user. The PII includes a plurality of personal identifiers. The method further includes identifying the PII in the user data through a predictive model. The predictive model is based on a classifier algorithm. The method further includes generating a secret pattern based on the PII identified through the predictive model. The secret pattern is an identifiable label. The method further includes adding the secret pattern to each of the plurality of personal identifiers in the PII. The method further includes identifying each of the plurality of personal identifiers through the secret pattern in real-time, when the user data is transmitted from the at least one data source to at least one data destination. The plurality of personal identifiers is stored in the at least one data destination.

In one embodiment, a system for identifying PII through secret patterns is disclosed. In one example, the system includes a processor and a computer-readable medium communicatively coupled to the processor. The computer-readable medium store processor-executable instructions, which, on execution, cause the processor to receive user data from at least one data source through a plurality of communication channels. It may be noted that the user data includes PII and non-PII. The user data is associated with a user. The PII includes a plurality of personal identifiers. The processor-executable instructions, on execution, further cause the processor to identify the PII in the user data through a predictive model, wherein the predictive model is based on a classifier algorithm. The processor-executable instructions, on execution, further cause the processor to generate a secret pattern based on the PII identified through the predictive model. The secret pattern is an identifiable label. The processor-executable instructions, on execution, further cause the processor to add the secret pattern to each of the plurality of personal identifiers in the PII. The processor-executable instructions, on execution, further cause the processor to identify each of the plurality of personal identifiers through the secret pattern in real-time, when the user data is transmitted from the at least one data source to at least one data destination. The plurality of personal identifiers is stored in the at least one data destination.

In one embodiment, a non-transitory computer-readable medium storing computer-executable instructions for identifying PII through secret patterns is disclosed. In one example, the stored instructions, when executed by a processor, cause the processor to perform operations including receiving user data from at least one data source through a plurality of communication channels. The user data includes PII and non-PII. The user data is associated with a user. The PII includes a plurality of personal identifiers. The operations further include identifying the PII in the user data through a predictive model. The predictive model is based on a classifier algorithm. The operations further include generating a secret pattern based on the PII identified through the predictive model. The secret pattern is an identifiable label. The operations further include adding the secret pattern to each of the plurality of personal identifiers in the PII. The operations further include identifying each of the plurality of personal identifiers through the secret pattern in real-time, when the user data is transmitted from the at least one data source to at least one data destination. The plurality of personal identifiers is stored in the at least one data destination.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
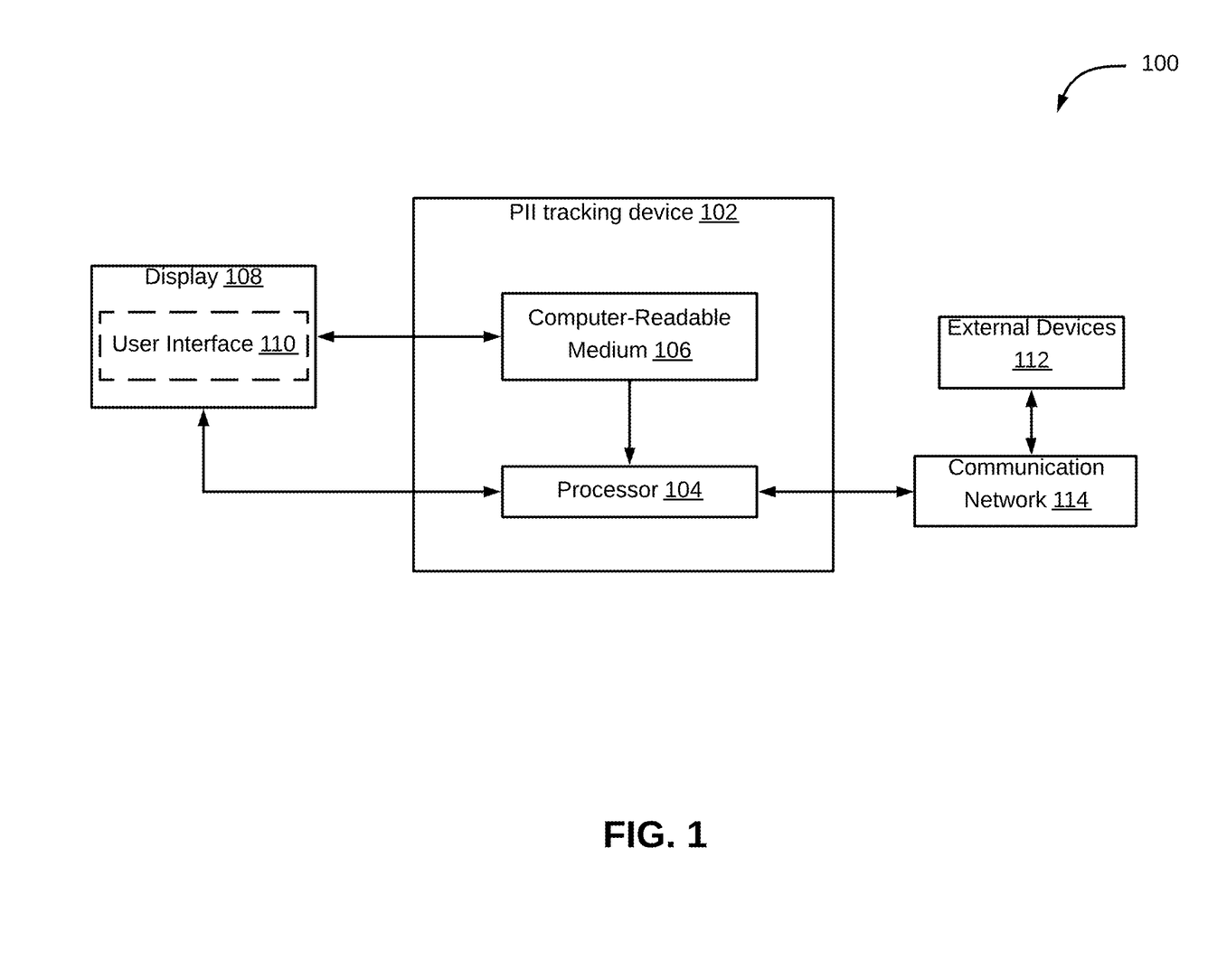
FIG. 1 is a block diagram of an exemplary system for identifying Personally Identifiable Information (PII) through secret patterns, in accordance with some embodiments.

Referring now to FIG. 1, an exemplary system 100 for identifying Personally Identifiable Information (PII) through secret patterns is illustrated, in accordance with some embodiments of the present disclosure. The system 100 may implement a PII tracking device 102 (for example, server, desktop, laptop, notebook, netbook, tablet, smartphone, mobile phone, or any other computing device), in accordance with some embodiments of the present disclosure. The PII tracking device 102 may identify PII through secret patterns (such as, labels, unique identifiers, encrypted keys, etc.) by adding a secret pattern to each of a plurality of personal identifiers in the PII. It should be noted that, in some embodiments, the PII tracking device 102 may identify PII in user data using a predictive model based on a classifier algorithm (such as, logistic regression, naïve Bayes, stochastic gradient descent, k-nearest neighbours, decision tree, random forest, support vector machine, and the like).

As will be described in greater detail in conjunction with FIGS. 2-4, the PII tracking device may receive user data from at least one data source through a plurality of communication channels. It may be noted that the user data includes PII and non-PII. The user data is associated with a user. The PII includes a plurality of personal identifiers. The PII tracking device may further identify the PII in the user data through a predictive model. The predictive model is based on a classifier algorithm. The PII tracking device may further generate a secret pattern based on the PII identified through the predictive model. The secret pattern is an identifiable label. The PII tracking device may further adding the secret pattern to each of the plurality of personal identifiers in the PII. The PII tracking device may further identifying each of the plurality of personal identifiers through the secret pattern in real-time, when the user data is transmitted from the at least one data source to at least one data destination. The plurality of personal identifiers is stored in the at least one data destination.

In some embodiments, the PII tracking device 102 may include one or more processors 104 and a computer-readable medium 106 (for example, a memory). The computer-readable medium 106 may include user data corresponding to a plurality of users. Further, the computer-readable storage medium 106 may store instructions that, when executed by the one or more processors 104, cause the one or more processors 104 to identify PII through secret patterns, in accordance with aspects of the present disclosure. The computer-readable storage medium 106 may also store various data (for example, the PII and corresponding plurality of personal identifiers, secret pattern for the PII, data trace graphs, reports, and the like) that may be captured, processed, and/or required by the system 100.

The system 100 may further include a display 108. The system 100 may interact with a user via a user interface 110 accessible via the display 108. The system 100 may also include one or more external devices 112. In some embodiments, the PII tracking device 102 may interact with the one or more external devices 112 over a communication network 114 for sending or receiving various data. The external devices 112 may include, but may not be limited to, a remote server, a digital device, or another computing system.

Figure 2:
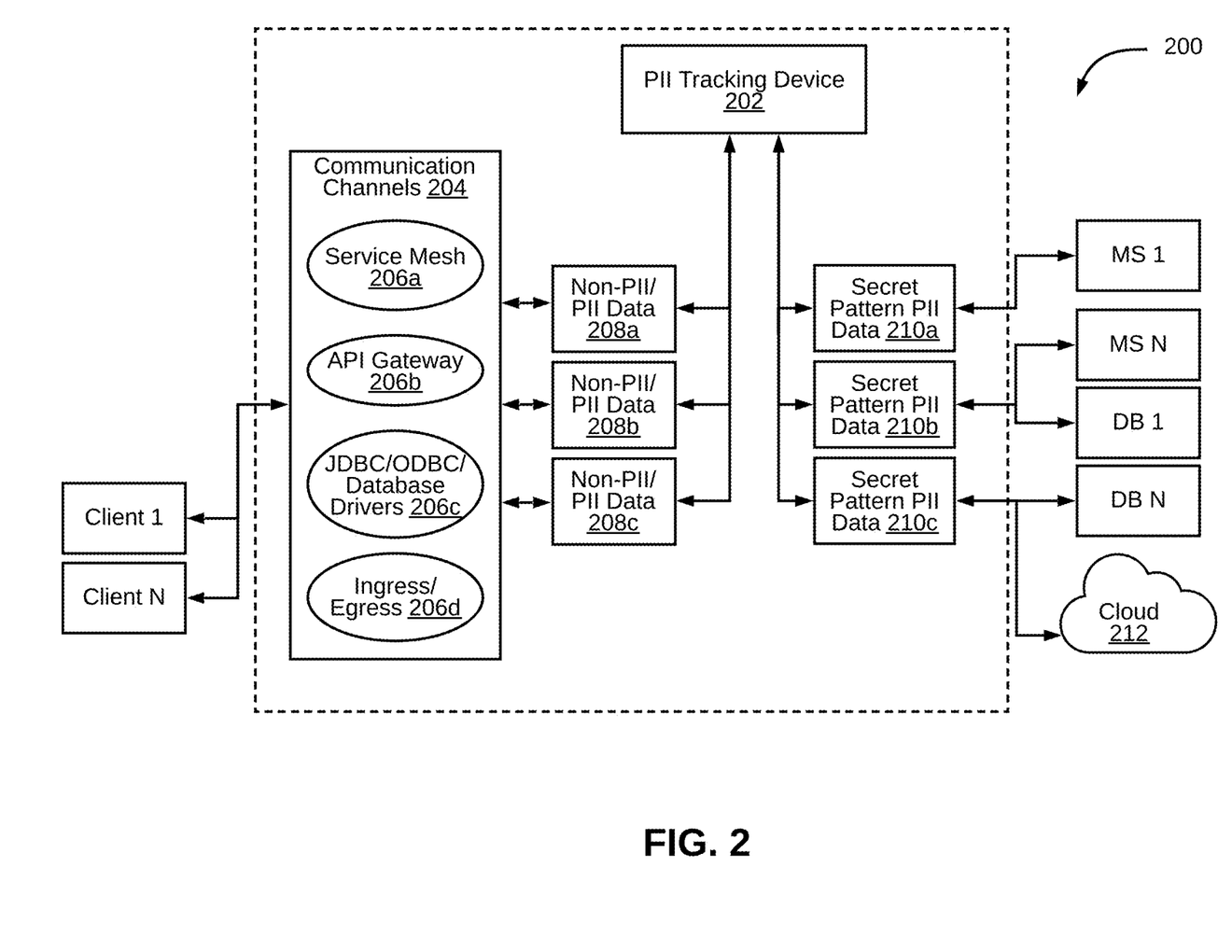
FIG. 2 illustrates a functional block diagram of an exemplary system for identifying PII through secret patterns, in accordance with some embodiments.

Referring now to FIG. 2, functional block diagram of an exemplary system 200 for identifying PII through secret patterns is illustrated, in accordance with some embodiments. The system 200 includes a PII tracking device 202 and communication channels 204. By way of an example, the communication channels 204 may include one or more of a service mesh 206a, an API gateway 206b, JDBC/ODBC/database drivers 206c, ingress/egress 206d, and the like. The communication channels 204 receive user data from each of a plurality of users (such as, client 1 and client N) through Representational State Transfer/Hypertext Transfer Protocol (REST/HTTP) or Advanced Message Queuing Protocol/Message Queuing Telemetry Transport (AMQP/MQTT). By way of an example, client 1 and client N may be a smartphone, a web application, etc. It may be noted that the user data associated with a user includes PII and non-PII (for example, non-PII/PII data 208a, non-PII/PII data 208b, non-PII/PII data 208c, etc.). The user data may be received in data storage file formats such as XML, JSON, etc. The PII further includes a plurality of personal identifiers corresponding to the user. Further, the communication channels 204 send the user data to the PII tracking device 202. The PII tracking device 202 includes a predictive model (not shown in figure) based on a classifier algorithm.

Further, the predictive model of the PII tracking device 202 classifies the user data. It may be noted that the classifying includes identifying the PII in the user data associated with each of the plurality of users. The PII includes a plurality of personal identifiers corresponding to the user. By way of an example, the plurality of personal identifiers may include a name, an address, a location, transaction history, banking details, or the like. Further, the PII tracking device 202 adds a secret pattern (for example, a data label, a unique identity, a unique identity, or the like) to the PII to obtain tagged PII (such as, secret pattern PII data 210a, secret pattern PII data 210b, secret pattern PII data 210c, etc.). It should be noted that the secret pattern is added to each of the plurality of personal identifiers for the PII associated with a first user. For a distinguishable second user, the secret pattern is distinguishable from the PII associated with the first user.

Further, the PII tracking device 202 sends the tagged PII to a destination. By way of an example, the destination may include microservices (such as, MS1 and MS N), databases (such as, DB 1 and DB N), cloud 212, or any other entity capable of data storage. Further, the PII tracking device 202 monitors data flow of the tagged PII through a data trace graph from source to destination. In some embodiments, the plurality of personal identifiers corresponding to the user may be sent to and stored in various destinations. The PII tracking device 202 generates a report corresponding to a user showing the data flow and destination of each of the plurality of personal identifiers associated with the user. When the user chooses to delete associated user data, each of the plurality of personal identifiers is deleted from respective destination. Additionally, when the user data is requested by an enterprise or a third-party partner enterprise, sharing of PII from the user data may be blocked or allowed accordingly.

Figure 3:
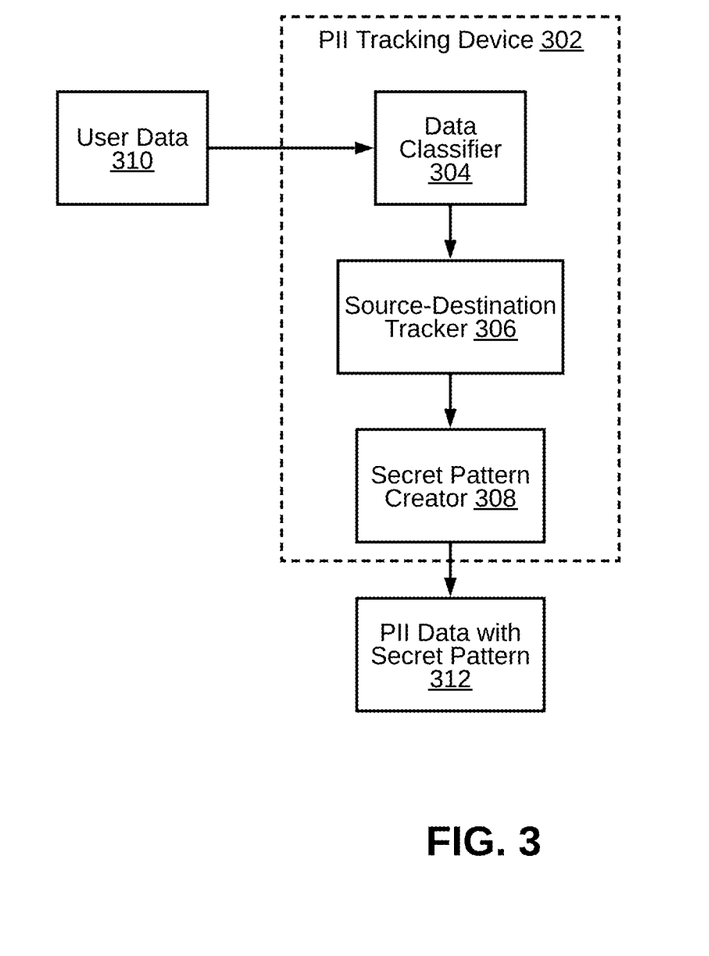
FIG. 3 illustrates a functional block diagram of a PII tracking device implemented by the exemplary system of FIG. 2, in accordance with some embodiments.

Referring now to FIG. 3, a functional block diagram of a PII tracking device 302 is illustrated, in accordance with some embodiments. In an embodiment, the PII tracking device 302 may include a data classifier 304, a source-destination tracker 306, and a secret pattern creator 308. In such an embodiment, the PII tracking device 300 may be analogous to the PII tracking device 202 of the system 200. The data classifier 304 receives user data 310 from a user. The user data 310 includes PII and non-PII. Further, the data classifier 304 classifies the user data 310 into PII and non-PII using a predictive model based on a classifier algorithm (such as, logistic regression, naïve Bayes, stochastic gradient descent, k-nearest neighbours, decision tree, random forest, support vector machine, and the like). It may be noted that the data classifier 304 identifies PII from different sources of communication channel calls and learns patterns of PII in user data with data signature elements. Further, the data classifier 304 shares the PII with the source-destination tracker 306. The source-destination tracker 306 creates a schema for the PII based on requested data source and expected destination corresponding to the PII.

Further, the source-destination tracker 306 shares the PII and the schema with the secret pattern creator 308. The secret pattern creator 208 generates a secret pattern (for example, a data label, a unique identifier, or an encrypted key) based on the PII and the schema. Further, the secret pattern creator 308 adds the secret pattern to the PII to obtain PII data with secret pattern 312. Further, the secret pattern creator 308 sends the tagged PII to a destination. By way of an example, the destination may include microservices, databases, cloud, or any other entity capable of data storage.

Further, the source-destination tracker 306 monitors data flow of the tagged PII through a data trace graph from source to destination. In some embodiments, the plurality of personal identifiers corresponding to the user may be sent to and stored in various destinations. In some embodiments, the PII tracking device 300 generates a report corresponding to a user showing the data flow and destination of each of the plurality of personal identifiers associated with the user. When the user chooses to delete associated user data, each of the plurality of personal identifiers is deleted from respective destination. Additionally, when the user data is requested by an enterprise or a third-party partner enterprise, sharing of PII from the user data may be blocked or allowed accordingly.

It should be noted that all such aforementioned modules 304-308 may be represented as a single module or a combination of different modules. Further, as will be appreciated by those skilled in the art, each of the modules 304-308 may reside, in whole or in parts, on one device or multiple devices in communication with each other. In some embodiments, each of the modules 304-308 may be implemented as dedicated hardware circuit comprising custom application-specific integrated circuit (ASIC) or gate arrays, off-the-shelf semiconductors such as logic chips, transistors, or other discrete components. Each of the modules 304-308 may also be implemented in a programmable hardware device such as a field programmable gate array (FPGA), programmable array logic, programmable logic device, and so forth. Alternatively, each of the modules 304-308 may be implemented in software for execution by various types of processors (e.g., processor 104). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for identifying PII through secret patterns. For example, the exemplary system 100 and the associated PII tracking device 102 may identify PII through secret patterns by the processes discussed herein. In particular, as will be appreciated by those of ordinary skill in the art, control logic and/or automated routines for performing the techniques and steps described herein may be implemented by the system 100 and the associated PII tracking device 102 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 4:
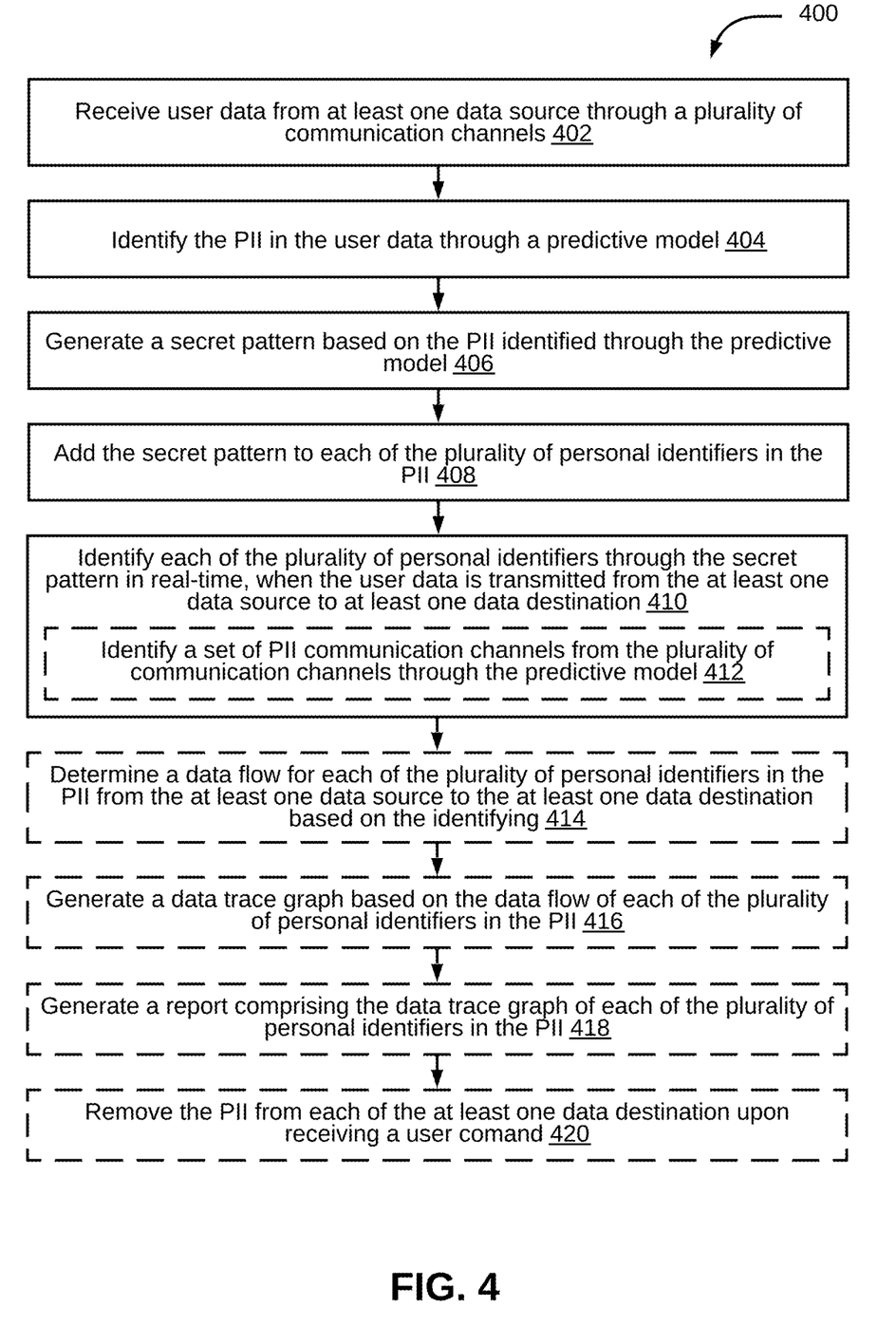
FIG. 4 illustrates a flow diagram of an exemplary process for identifying PII through secret patterns, in accordance with some embodiments.

Referring now to FIG. 4, an exemplary process 400 for identifying PII through secret patterns is depicted via a flowchart, in accordance with some embodiments. The process 400 may be implemented by the PII tracking device 102 of the system 100. The process 400 includes receiving user data from at least one data source through a plurality of communication channels (such as communication channels 204), at step 402. It may be noted that the user data includes PII and non-PII. The user data is associated with a user. The PII includes a plurality of personal identifiers. By way of an example, the plurality of communication channels may include a service mesh, an Application Programming Interface (API) gateway, a Java Database Connectivity (JDBC) driver, and an Open Database Connectivity (ODBC) driver. Further, the process 400 includes identifying the PII in the user data through a predictive model, at step 404. The predictive model is based on a classifier algorithm. By way of an example, the data classifier 304 receives the user data 310 associated with a user. The user data includes PII and non-PII. The data classifier 304 identifies the PII from the user data through a predictive model based on a classifier algorithm.

Further, the process 400 includes generating a secret pattern based on the PII identified through the predictive model, at step 406. It may be noted that the secret pattern is an identifiable label. Further, the process 400 includes adding the secret pattern to each of the plurality of personal identifiers in the PII, at step 408. Further, the process 400 includes identifying each of the plurality of personal identifiers through the secret pattern in real-time, when the user data is transmitted from the at least one data source to at least one data destination, at step 410. The plurality of personal identifiers is stored in the at least one data destination. Further, the step 410 of the process 400 includes identifying a set of PII communication channels from the plurality of communication channels through the predictive model, at step 412. Each of the set of PII communication channels exchanges the PII of the user data with the data source. In continuation of the example above, the data classifier 304 sends the PII to the source-destination tracker 306. The source-destination tracker 306 may determine a schema for the PII. Further, the secret pattern creator 308 generates a secret pattern for the PII based on the PII and the schema. Further, the secret pattern injector 308 adds the secret pattern to each of the plurality of personal identifiers of the PII to obtain tagged PII.

Further, the process 400 includes determining a data flow for each of the plurality of personal identifiers in the PII from the at least one data source to the at least one data destination based on the identifying, at step 414. Further, the process 400 includes generating a data trace graph based on the data flow of each of the plurality of personal identifiers in the PII, at step 416. The data flow of each of the plurality of personal identifiers in the PII is visualized through the data trace graph. Further, the process 400 includes generating a report including the data trace graph of each of the plurality of personal identifiers in the PII, at step 418. In continuation of the example above, the secret pattern creator 308 send the tagged PII to the destination based on the schema. Further, the source-destination tracker 306 monitors the data flow of the tagged PII through data trace graph.

Further, the process 400 includes removing the PII from each of the at least one data destination upon receiving a user command, at step 420. Alternately, the PII tracking device 302 may receive a data transfer request for transmitting the user data from the at least one data destination to at least one secondary data destination and remove the PII from the user data prior to transmitting the user data from the at least one data destination to the at least one secondary data destination.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 5:
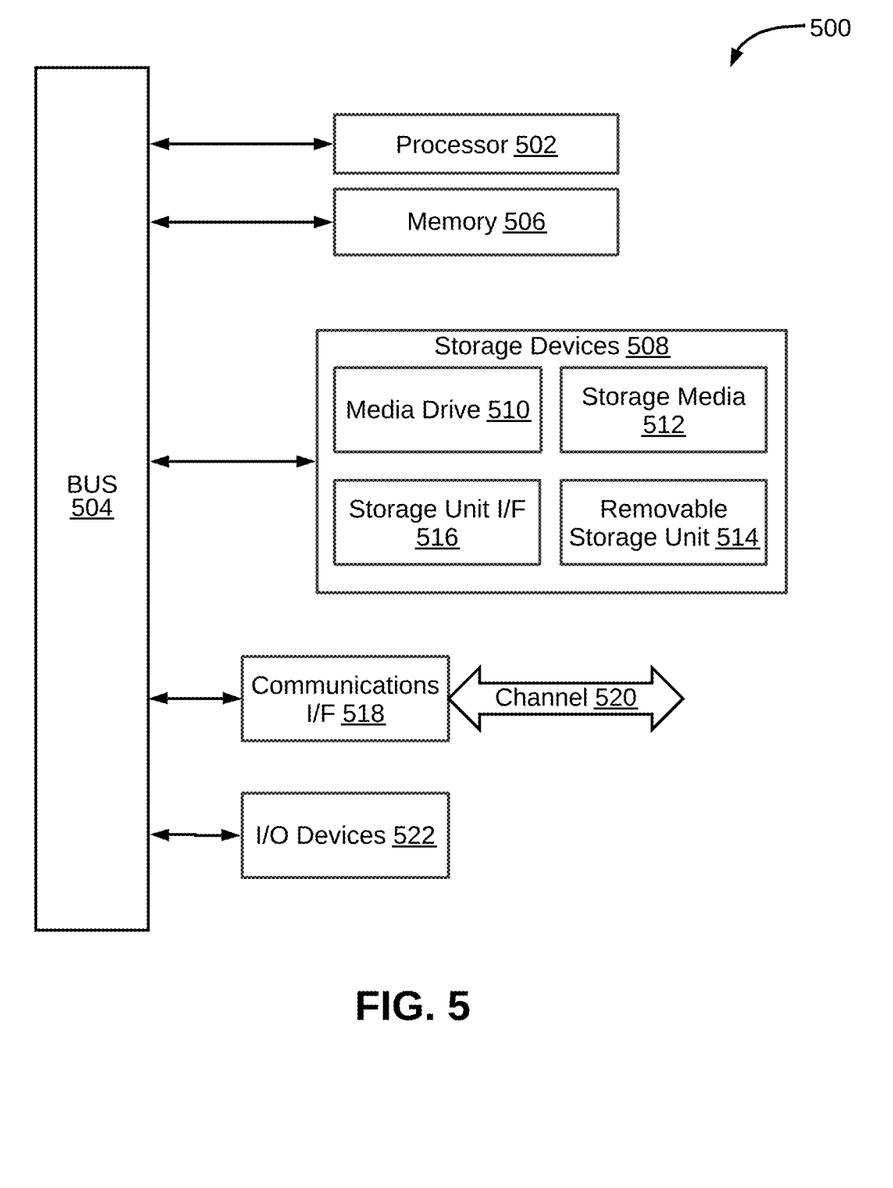
FIG. 5 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 5, an exemplary computing system 500 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 500 may represent, for example, a user device such as a desktop, a laptop, a mobile phone, personal entertainment device, DVR, and so on, or any other type of special or general-purpose computing device as may be desirable or appropriate for a given application or environment. The computing system 500 may include one or more processors, such as a processor 502 that may be implemented using a general or special purpose processing engine such as, for example, a microprocessor, microcontroller or other control logic. In this example, the processor 502 is connected to a bus 504 or other communication medium. In some embodiments, the processor 502 may be an Artificial Intelligence (AI) processor, which may be implemented as a Tensor Processing Unit (TPU), or a graphical processor unit, or a custom programmable solution Field-Programmable Gate Array (FPGA).

The computing system 500 may also include a memory 506 (main memory), for example, Random Access Memory (RAM) or other dynamic memory, for storing information and instructions to be executed by the processor 502. The memory 506 also may be used for storing temporary variables or other intermediate information during execution of instructions to be executed by the processor 502. The computing system 500 may likewise include a read only memory ("ROM") or other static storage device coupled to bus 504 for storing static information and instructions for the processor 502.

The computing system 500 may also include a storage devices 508, which may include, for example, a media drive 510 and a removable storage interface. The media drive 510 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 512 may include, for example, a hard disk, magnetic tape, flash drive, or other fixed or removable medium that is read by and written to by the media drive 510. As these examples illustrate, the storage media 512 may include a computer-readable storage medium having stored therein particular computer software or data.

In alternative embodiments, the storage devices 508 may include other similar instrumentalities for allowing computer programs or other instructions or data to be loaded into the computing system 500. Such instrumentalities may include, for example, a removable storage unit 514 and a storage unit interface 516, such as a program cartridge and cartridge interface, a removable memory (for example, a flash memory or other removable memory module) and memory slot, and other removable storage units and interfaces that allow software and data to be transferred from the removable storage unit 514 to the computing system 500.

The computing system 500 may also include a communications interface 518. The communications interface 518 may be used to allow software and data to be transferred between the computing system 500 and external devices. Examples of the communications interface 518 may include a network interface (such as an Ethernet or other NIC card), a communications port (such as for example, a USB port, a micro USB port), Near field Communication (NFC), etc. Software and data transferred via the communications interface 518 are in the form of signals which may be electronic, electromagnetic, optical, or other signals capable of being received by the communications interface 518. These signals are provided to the communications interface 518 via a channel 520. The channel 520 may carry signals and may be implemented using a wireless medium, wire or cable, fiber optics, or other communications medium. Some examples of the channel 520 may include a phone line, a cellular phone link, an RF link, a Bluetooth link, a network interface, a local or wide area network, and other communications channels.

The computing system 500 may further include Input/Output (I/O) devices 522. Examples may include, but are not limited to a display, keypad, microphone, audio speakers, vibrating motor, LED lights, etc. The I/O devices 522 may receive input from a user and also display an output of the computation performed by the processor 502. In this document, the terms "computer program product" and "computer-readable medium" may be used generally to refer to media such as, for example, the memory 506, the storage devices 508, the removable storage unit 514, or signal(s) on the channel 520. These and other forms of computer-readable media may be involved in providing one or more sequences of one or more instructions to the processor 502 for execution. Such instructions, generally referred to as "computer program code" (which may be grouped in the form of computer programs or other groupings), when executed, enable the computing system 500 to perform features or functions of embodiments of the present invention.

In an embodiment where the elements are implemented using software, the software may be stored in a computer-readable medium and loaded into the computing system 500 using, for example, the removable storage unit 514, the media drive 510 or the communications interface 518. The control logic (in this example, software instructions or computer program code), when executed by the processor 502, causes the processor 502 to perform the functions of the invention as described herein.

Thus, the disclosed method and system try to overcome the technical problem of identifying PII through secret patterns. The method and system require a minimal configuration overhead and provide maximum security. Further, the method and system provide for making existing application environments more safety and privacy compliant. Further, the method and system reduce overall application development time and cost on PII detection and traceability.

As will be appreciated by those skilled in the art, the techniques described in the various embodiments discussed above are not routine, or conventional, or well understood in the art. The techniques discussed above provide for identifying PII through secret patterns. The techniques first receive user data from at least one data source through a plurality of communication channels. The user data includes PII and non-PII. The user data is associated with a user. The PII includes a plurality of personal identifiers. The techniques then identify the PII in the user data through a predictive model. The predictive model is based on a classifier algorithm. The techniques then generate a secret pattern based on the PII identified through the predictive model. The secret pattern is an identifiable label. The techniques then add the secret pattern to each of the plurality of personal identifiers in the PII. The techniques then identify each of the plurality of personal identifiers through the secret pattern in real-time, when the user data is transmitted from the at least one data source to at least one data destination. The plurality of personal identifiers is stored in the at least one data destination.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for identifying PII through secret patterns. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for identifying Personally Identifiable Information (PII) through secret patterns, the method comprising:
   receiving, by a PII tracking device, user data from at least one data source through a plurality of communication channels, wherein the user data comprises PII and non-PII, wherein the user data is associated with a user, and wherein the PII comprises a plurality of personal identifiers;
   identifying, by the PII tracking device, the PII in the user data through a predictive model, wherein the predictive model is based on a classifier algorithm;
   generating, by the PII tracking device, a secret pattern based on the PII identified through the predictive model, wherein the secret pattern is an identifiable label;
   adding, by the PII tracking device, the secret pattern to each of the plurality of personal identifiers in the PII; and
   identifying, by the PII tracking device, each of the plurality of personal identifiers through the secret pattern in real-time, when the user data is transmitted from the at least one data source to at least one data destination, wherein the plurality of personal identifiers is stored in the at least one data destination.

2. The method of claim 1, further comprising determining a data flow for each of the plurality of personal identifiers in the PII from the at least one data source to the at least one data destination based on the identifying.

3. The method of claim 2, further comprising generating a data trace graph based on the data flow of each of the plurality of personal identifiers in the PII, wherein the data flow of each of the plurality of personal identifiers in the PII is visualized through the data trace graph.

4. The method of claim 3, further comprising generating a report comprising the data trace graph of each of the plurality of personal identifiers in the PII.

5. The method of claim 1, wherein identifying the PII in the user data through the predictive model further comprises identifying a set of PII communication channels from the plurality of communication channels through the predictive model, wherein each of the set of PII communication channels exchanges the PII of the user data with the data source.

6. The method of claim 1, further comprising:
receiving a data transfer request for transmitting the user data from the at least one data destination to at least one secondary data destination; and
removing the PII from the user data prior to transmitting the user data from the at least one data destination to the at least one secondary data destination.

7. The method of claim 1, further comprising removing the PII from each of the at least one data destination upon receiving a user command.

8. The method of claim 1, wherein the plurality of communication channels comprises a service mesh, an Application Programming Interface (API) gateway, a Java Database Connectivity (JDBC) driver, and an Open Database Connectivity (ODBC) driver.

9. A system for identifying Personally Identifiable Information (PII) through secret patterns, the system comprising:
a processor; and
a memory communicatively coupled to the processor, wherein the memory stores processor instructions, which when executed by the processor, cause the processor to:
receive user data from at least one data source through a plurality of communication channels, wherein the user data comprises PII and non-PII, wherein the user data is associated with a user, and wherein the PII comprises a plurality of personal identifiers;
identify the PII in the user data through a predictive model, wherein the predictive model is based on a classifier algorithm;
generate a secret pattern based on the PII identified through the predictive model, wherein the secret pattern is an identifiable label;
add the secret pattern to each of the plurality of personal identifiers in the PII; and
identify each of the plurality of personal identifiers through the secret pattern in real-time, when the user data is transmitted from the at least one data source to at least one data destination, wherein the plurality of personal identifiers is stored in the at least one data destination.

10. The system of claim 9, wherein the processor instructions, on execution, further cause the processor to determine a data flow for each of the plurality of personal identifiers in the PII from the at least one data source to the at least one data destination based on the identifying.

11. The system of claim 10, wherein the processor instructions, on execution, further cause the processor to generate a data trace graph based on the data flow of each of the plurality of personal identifiers in the PII, wherein the data flow of each of the plurality of personal identifiers in the PII is visualized through the data trace graph.

12. The system of claim 11, wherein the processor instructions, on execution, further cause the processor to generate a report comprising the data trace graph of each of the plurality of personal identifiers in the PII.

13. The system of claim 9, wherein to identify the PII in the user data through the predictive model, the processor instructions, on execution, further cause the processor to identify a set of PII communication channels from the plurality of communication channels through the predictive model, wherein each of the set of PII communication channels exchanges the PII of the user data with the data source.

14. The system of claim 9, wherein the processor instructions, on execution, further cause the processor to:
receive a data transfer request for transmitting the user data from the at least one data destination to at least one secondary data destination; and
remove the PII from the user data prior to transmitting the user data from the at least one data destination to the at least one secondary data destination.

15. The system of claim 9, wherein the processor instructions, on execution, further cause the processor to remove the PII from each of the at least one data destination upon receiving a user command.

16. The system of claim 9, wherein the plurality of communication channels comprises a service mesh, an Application Programming Interface (API) gateway, a Java Database Connectivity (JDBC) driver, and an Open Database Connectivity (ODBC) driver.

17. A non-transitory computer-readable medium storing computer-executable instructions for identifying Personally Identifiable Information (PII) through secret patterns, the computer-executable instructions configured for:
receiving user data from at least one data source through a plurality of communication channels, wherein the user data comprises PII and non-PII, wherein the user data is associated with a user, and wherein the PII comprises a plurality of personal identifiers;
identifying the PII in the user data through a predictive model, wherein the predictive model is based on a classifier algorithm;
generating a secret pattern based on the PII identified through the predictive model, wherein the secret pattern is an identifiable label;
adding the secret pattern to each of the plurality of personal identifiers in the PII; and
identifying each of the plurality of personal identifiers through the secret pattern in real-time, when the user data is transmitted from the at least one data source to at least one data destination, wherein the plurality of personal identifiers is stored in the at least one data destination.

18. The non-transitory computer-readable medium of claim 17, wherein the computer-executable instructions are further configured for determining a data flow for each of the plurality of personal identifiers in the PII from the at least one data source to the at least one data destination based on the identifying.

19. The non-transitory computer-readable medium of claim 18, wherein the computer-executable instructions are further configured for generating a data trace graph based on the data flow of each of the plurality of personal identifiers in the PII, wherein the data flow of each of the plurality of personal identifiers in the PII is visualized through the data trace graph.

20. The non-transitory computer-readable medium of claim 19, wherein the computer-executable instructions are further configured for generating a report comprising the data trace graph of each of the plurality of personal identifiers in the PII.

* * * * *